United States Patent
Tzivanis et al.

(10) Patent No.: US 11,840,044 B2
(45) Date of Patent: Dec. 12, 2023

(54) MULTILAYER TUBE AND METHOD FOR MAKING SAME

(71) Applicant: SAINT-GOBAIN PERFORMANCE PLASTICS CORPORATION, Solon, OH (US)

(72) Inventors: Michael J. Tzivanis, Chicopee, MA (US); Jianfeng Zhang, Shrewsbury, MA (US); Xipeng Liu, Concord, MA (US); Charles S. Golub, Westford, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 119 days.

(21) Appl. No.: 17/228,182

(22) Filed: Apr. 12, 2021

(65) Prior Publication Data

US 2021/0323262 A1     Oct. 21, 2021

Related U.S. Application Data

(60) Provisional application No. 63/011,728, filed on Apr. 17, 2020.

(51) Int. Cl.
*F16L 11/04*     (2006.01)
*B32B 1/08*     (2006.01)
(Continued)

(52) U.S. Cl.
CPC ............... *B32B 1/08* (2013.01); *B29C 48/09* (2019.02); *B29C 48/21* (2019.02); *B32B 25/042* (2013.01);
(Continued)

(58) Field of Classification Search
CPC ...... B32B 1/08; B32B 27/285; B32B 2597/00
See application file for complete search history.

(56) References Cited

U.S. PATENT DOCUMENTS

| | | |
|---|---|---|
| 6,451,396 B1 | 9/2002 | Zumbrum et al. |
| 7,891,636 B2 | 2/2011 | Zhang et al. |
| (Continued) | | |

FOREIGN PATENT DOCUMENTS

| | | | |
|---|---|---|---|
| JP | 2004137390 A | | 5/2004 |
| JP | 2005246950 A | * | 9/2005 |
| (Continued) | | | |

OTHER PUBLICATIONS

The MatWeb Material Property Data website ("MatWeb") for Shin-Etsu Silicones KE-951U Silicone Elastomer available online at https://www.matweb.com/search/datasheet.aspx?matguid=381aa743d5af4fec856c849606054ac1&ckck=1 accessed May 22, 2023 (Year: 2023).*

(Continued)

*Primary Examiner* — Lee E Sanderson
(74) *Attorney, Agent, or Firm* — Abel Schillinger, LLP; Chi Suk Kim

(57) ABSTRACT

The present disclosure relates to a multilayer tube that may include an inner layer and an outer layer. The inner layer may include a fluoroether elastomer and the outer layer may include a non-fluoroether based elastomer. The multilayer tube may further include an adhesion force between the inner layer and the outer layer of at least about 1 ppi.

18 Claims, 1 Drawing Sheet

(51) Int. Cl.
  *B32B 25/04* (2006.01)
  *B29C 48/09* (2019.01)
  *B29C 48/21* (2019.01)
  *C08G 65/00* (2006.01)
  *C08G 71/04* (2006.01)
  *C08G 77/24* (2006.01)
  *B32B 27/28* (2006.01)
  *B29K 19/00* (2006.01)

(52) U.S. Cl.
  CPC ............ *B32B 27/285* (2013.01); *C08G 65/00* (2013.01); *C08G 71/04* (2013.01); *C08G 77/24* (2013.01); *F16L 11/04* (2013.01); *B29K 2019/00* (2013.01); *B32B 2597/00* (2013.01)

(56) References Cited

U.S. PATENT DOCUMENTS

| | | |
|---|---|---|
| 2002/0043330 A1 | 4/2002 | Stripe |
| 2002/0198320 A1 | 12/2002 | Chmielewski et al. |
| 2003/0049399 A1* | 3/2003 | Noguchi ............... C08L 27/16 428/36.9 |
| 2004/0023037 A1 | 2/2004 | Baumert et al. |
| 2006/0014895 A1 | 1/2006 | Shiono |
| 2009/0202759 A1 | 8/2009 | O'Brien et al. |
| 2018/0356011 A1 | 12/2018 | D'Hondt |
| 2020/0262188 A1* | 8/2020 | Tsuboi ................. B32B 1/08 |

FOREIGN PATENT DOCUMENTS

| | | |
|---|---|---|
| JP | 2005248149 A | 9/2005 |
| KR | 1020080022174 A | 3/2008 |
| WO | 2006129029 A3 | 12/2006 |
| WO | 2021211442 A1 | 10/2021 |

OTHER PUBLICATIONS

International Search Report and Written Opinion for PCT/US2021/026861 dated Aug. 4, 2021, 10 pages.

* cited by examiner

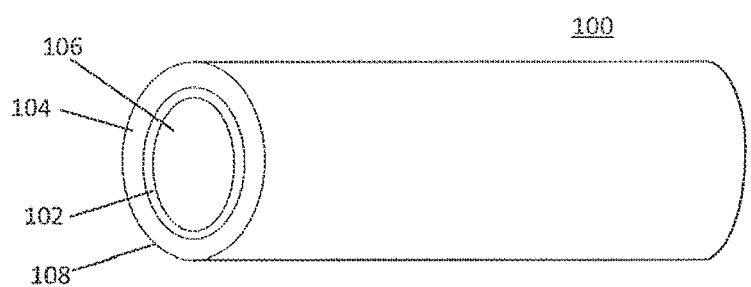

MULTILAYER TUBE AND METHOD FOR MAKING SAME

CROSS-REFERENCE TO RELATED APPLICATION(S)

This application claims priority under 35 U.S.C. § 119(e) to U.S. Provisional Application No. 63/011,728, entitled "MULTILAYER TUBE AND METHOD FOR MAKING SAME," by Michael J. TZIVANIS et al., filed Apr. 17, 2020, which is assigned to the current assignee hereof and incorporated herein by reference in its entirety.

FIELD OF THE DISCLOSURE

The present disclosure relates to a multilayer tube and a method for making the same, and in particular, relates to a multilayer fluid conduit.

BACKGROUND

Hoses and tubing are used in a variety of industries including cleaning and household industries, food processing, chemical industries, and pharmaceutical industries. In such industries, fluid conduits that have a low surface energy inner surface are used because they are easy to clean and resistant to contaminants. In particular, such industries are turning to low surface energy polymers such as fluoropolymers. However, such fluoropolymers are expensive and often have undesirable properties for certain applications.

Industry uses such fluoropolymers as liners for fluid conduit. However, many fluoropolymers desirable as an inner surface are difficult to adhere to other surfaces. For instance, when exposed to certain solvents, such as laundry detergents, delamination between a fluoropolymer and a substrate typically occurs. Further, many fluoropolymers also are inflexible, making the material undesirable for applications that require stress, such as bend radius, pressures, and the like.

As such, an improved multilayer polymer article would be desirable.

SUMMARY

According to a first aspect, a multilayer tube may include an inner layer and an outer layer. The inner layer may include a fluoroether elastomer and the outer layer may include a non-fluoroether based elastomer. The multilayer tube may further include an adhesion force between the inner layer and the outer layer of at least about 1 ppi.

According to yet another aspect, a method of forming a multilayer tube may include providing an inner layer, providing an outer layer overlying the inner layer and curing the inner layer and the outer layer to form a multilayer tube. The inner layer may include a fluoroether elastomer and the outer layer may include a non-fluoroether based elastomer. The multilayer tube may further include an adhesion force between the inner layer and the outer layer of at least about 1 ppi.

BRIEF DESCRIPTION OF THE DRAWINGS

Embodiments are illustrated by way of example and are not limited to the accompanying figures.

FIG. 1 includes an illustration of an exemplary multilayer tube.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a multilayer tube that may include an inner layer and an outer layer. According to particular embodiments, the inner layer may include a fluoroether elastomer. According to yet other embodiments, the outer layer may include a non-fluoroether based elastomer. Advantageously, the multilayer tube has properties for applications that include exposure to chemical solutions, dynamic stress, or combination thereof. According to yet other embodiments, a method of forming a multilayer tube is further described.

According to certain embodiments, the fluoroether elastomer of the inner layer may include a particular material. For example, the fluoroether elastomer of the inner layer may include a fluorosilicone rubber, fluoroelastomers, perfluoroelastomers, or any combination thereof. According to certain embodiments, the fluoroether elastomer of the inner layer may be a fluorosilicone rubber. According to still other embodiments, the fluoroether elastomer of the inner layer may be a fluoroelastomer. According to yet other embodiments, the fluoroether elastomer of the inner layer may be a fluoroelastomer. According to other embodiments, the fluoroether elastomer of the inner layer may be any combination of a fluorosilicone rubber, fluoroelastomers, and a perfluoroelastomers.

According to certain embodiments, the fluoroether elastomer of the inner layer may consist of a particular material. For example, the fluoroether elastomer of the inner layer may consist of a fluorosilicone rubber, fluoroelastomers, perfluoroelastomers, or any combination thereof. According to certain embodiments, the fluoroether elastomer of the inner layer may consist of a fluorosilicone rubber. According to still other embodiments, the fluoroether elastomer of the inner layer may consist of a fluoroelastomer. According to yet other embodiments, the fluoroether elastomer of the inner layer may consist of a perfluoroelastomer. According to other embodiments, the fluoroether elastomer of the inner layer may consist of any combination of a fluorosilicone rubber, fluoroelastomers, and a perfluoroelastomers.

According to still other embodiments, the inner layer may be a fluoroether elastomer layer. According to certain embodiments, the inner layer may be a particular material layer. For example, the fluoroether elastomer of the inner layer may be a fluorosilicone rubber layer, a fluoroelastomer layer, or a perfluoroelastomer layer.

According to yet other embodiments, the fluoroether elastomer of the inner layer may be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinylidene difluoride, vinyl fluoride, perfluoropropyl vinyl ether, perfluoromethyl vinyl ether, ethylene, propylene, or any combination thereof. According to still other embodiments, the fluoroether elastomer of the inner layer may include at least one monomer unit having a chemical moiety that bonds the fluoroether elastomer to the non-fluoroether based elastomer of the outer layer. According to a particular embodiment, the fluoroether elastomer of the inner layer may include at least two monomer units, where the monomer units include vinylidene fluoride, hexafluoropropylene, tetrafluoroethylene, perfluoromethylvinyl ether, ethylene, polypropylene, or any combination thereof. According to still other embodiments, at least one monomer unit of the fluoroether elastomer of the inner layer includes a fluorine atom.

According to still other embodiments, the fluoroether elastomer may include a fluoroether elastomer with silicone cross-linking groups (e.g., "SIFEL", manufactured by Shinetsu Chemical Co., Ltd.). According to yet other embodiments, the fluoroether elastomer consist of a fluoroether elastomer with silicone cross-linking groups (e.g., "SIFEL", manufactured by Shin-etsu Chemical Co., Ltd.).

According to still other embodiments, the fluoroether elastomer of the inner layer may include a terpolymer of ethylene, tetrafluoroethylene (TFE), and perfluoromethylvinyl ether (PMVE), a copolymer of hexafluoropropylene and vinylidene fluoride, a terpolymer of tetrafluoroethylene, hexafluoropropylene, and vinylidene fluoride, a terpolymer of tetrafluoroethylene, perfluoromethylvinyl ether, and vinylidene fluoride, a terpolymer of tetrafluoroethylene, propylene, and vinylidene fluoride, a pentapolymer of tetrafluoroethylene, hexafluoropropylene, ethylene, perfluoromethylvinyl ether, and vinylidene fluoride, any blend, or combination thereof.

In further embodiments, the inner layer may include any additive envisioned. According to certain embodiments, the additive may include, for example, a curing agent, an antioxidant, a filler, an ultraviolet (UV) agent, a dye, a pigment, an anti-aging agent, a plasticizer, the like, or combination thereof. In an embodiment, the curing agent is a cross-linking agent provided to increase and/or enhance crosslinking of the fluoroether elastomer of the inner layer. In a further embodiment, the use of a curing agent may provide desirable properties such as decreased permeation of small molecules and improved elastic recovery of the inner layer compared to an inner layer that does not include a curing agent. Any curing agent is envisioned such as, for example, a dihydroxy compound, a diamine compound, an organic peroxide, or combination thereof. An exemplary dihydroxy compound includes a bisphenol AF. An exemplary diamine compound includes hexamethylene diamine carbamate. In an embodiment, the curing agent is an organic peroxide. Any amount of curing agent is envisioned. Alternatively, the inner layer may be substantially free of cross-linking agents, curing agents, photoinitiators, fillers, plasticizers, or a combination thereof. "Substantially free" as used herein refers to less than about 1.0% by weight, or even less than about 0.1% by weight of the total weight of the fluoroether elastomer of the inner layer.

According to certain embodiments, the inner layer may include a particular content of the fluoroether elastomer. For example, the inner layer may include a fluoroether elastomer content of at least about 70 wt. % for a total weight of the inner layer, such as, at least about 71 wt. % or at least about 72 wt. % or at least about 73 wt. % or at least about 74 wt. % or at least about 75 wt. % or at least about 76 wt. % or at least about 77 wt. % or at least about 78 wt. % or at least about 79 wt. % or at least about 80 wt. % or at least about 81 wt. % or at least about 82 wt. % or at least about 83 wt. % or at least about 84 wt. % or at least about 85 wt. % or at least about 86 wt. % or at least about 87 wt. % or at least about 88 wt. % or at least about 89 wt. % or at least about 90 wt. % or at least about 91 wt. % or at least about 92 wt. % or at least about 93 wt. % or at least about 94 wt. % or at least about 95 wt. % or at least about 96 wt. % or at least about 97 wt. % or at least about 98 wt. % or at least about 99 wt. % or even at least about 100 wt. %. It will be appreciated that the fluoroether elastomer content in the inner layer may be within a range between any of the values noted above. It will be further appreciated that the fluoroether elastomer content in the inner layer may be any value between any of the minimum and maximum values noted above.

According to certain embodiments, the inner layer may have a desirable hardness. For instance, the hardness of the inner layer is shore D of less than about 95, such as, a shore A of about 20 to shore D of about 95, such as shore A of about 20 to shore D of about 65, such as shore A of about 20 to about 80 as measured by ASTM D2240. In an embodiment, the hardness of the inner layer is a shore A of less than about 80, such as about 20 to about 80, such as about 40 to about 80, or even about 40 to about 60. It will be appreciated that the hardness can be within a range between any of the minimum and maximum values noted above.

According to certain embodiments, the fluoroether elastomer of the inner layer may have a particular flexible modulus as measured by ASTM D790. For instance, the fluoroether elastomer of the inner layer may have a flexural modulus of at least bout 50 MPa, such as, at least about 60 MPa or at least about 70 MPa or at least about 80 MPa or at least about 90 MPa or at least about 100 MPa or at least about 110 MPa or at least about 120 MPa or at least about 130 MPa or at least about 140 MPa or at least about 150 MPa or at least about 160 MPa or at least about 170 MPa or at least about 180 MPa or at least about 190 MPa or at least about 200 MPa or at least about 210 MPa or at least about 220 MPa or at least about 230 MPa or at least about 240 MPa or even at least about 250 MPa. According to still other embodiments, the fluoroether elastomer may have a flexural modulus of not greater than about 850 MPa, such as, not greater than about 800 MPa or not greater than about 750 MPa or not greater than about 700 MPa or not greater than about 650 MPa or not greater than about 600 MPa or not greater than about 550 MPa or not greater than about 500

MPa or not greater than about 450 MPa or not greater than about 400 MPa or not greater than about 350 MPa or even not greater than about 300 MPa. It will be appreciated that the flexural modulus of the fluoroether elastomer of the inner layer may be within a range between any of the minimum and maximum values noted above. It will be further appreciated that the flexural modulus of the fluoroether elastomer of the inner layer may be any value between any of the minimum and maximum values noted above.

In another embodiment, the fluoroether elastomer of the inner layer may have a particular elongation at yield as measured by ASTM D790. For example, the fluoroether elastomer of the inner layer may have an elongation at yield of at least about 5%, such as, at least about 6% or at least about 7% or at least about 8% or at least about 9% or at least about 10%. It will be appreciated that the elongation at yield of the fluoroether elastomer of the inner layer may be within a range between any of the values noted above. It will be further appreciated that the elongation at yield of the fluoroether elastomer of the inner layer may be any value between any of the values noted above.

According to still other embodiments, the non-fluoroether based elastomer of the outer layer may include a particular material. For example, the non-fluoroether based elastomer of the outer layer may include silicone, a polyolefin elastomer, a polyurethane elastomer, a diene elastomer, a butyl rubber, a natural rubber, a polyurethane rubber, an ethylene propylene diene monomer rubber, an isoprene rubber, a nitrile rubber, a styrene butadiene rubber, a blend, or any combination thereof.

According to yet other embodiments, the non-fluoroether based elastomer of the outer layer may consist of a particular material. For example, the non-fluoroether based elastomer of the outer layer may consist of silicone, a polyolefin elastomer, a polyurethane elastomer, a diene elastomer, a butyl rubber, a natural rubber, a polyurethane rubber, an ethylene propylene diene monomer rubber, an isoprene rubber, a nitrile rubber, a styrene butadiene rubber, a blend, or any combination thereof.

According to still other embodiments, the outer layer may be a non-fluoroether based elastomer layer. According to other embodiments, the outer layer may be a silicone layer. According to yet other embodiments, the outer layer may be a polyolefin elastomer layer. According to still other embodiments, the outer layer may be a polyurethane elastomer layer. According to other embodiments, the outer layer may be a diene elastomer layer. According to still other embodiments, the outer layer may be a butyl rubber layer. According to other embodiments, the outer layer may be a natural rubber layer. According to yet other embodiments, the outer layer may be a polyurethane rubber layer. According to still other embodiments, the outer layer may be an ethylene propylene diene monomer rubber layer. According to other embodiments, the outer layer may be an isoprene rubber layer. According to still other embodiments, the outer layer may be a nitrile rubber layer. According to still other embodiments, the outer layer may be a styrene butadiene rubber layer.

According to yet other embodiments, the non-fluoroether based elastomer of the outer layer may include any thermoplastic vulcanizate, thermoplastic polymer, thermoset polymer, or combination thereof envisioned that is free of a fluorine atom. In a certain embodiment, the non-fluoroether based elastomer of the outer layer may include a thermoset polymer. According to still other embodiments, the non-fluoroether based elastomer of the outer layer may include at least one monomer unit having a chemical moiety that bonds the non-fluoroether based elastomer to the fluoroether elastomer of the inner layer with the proviso that the monomer unit does not include a fluorine atom. In an embodiment, the non-fluoroether based elastomer of the outer layer may include a thermoplastic polyurethane, a thermoset urethane, a diene elastomer, a styrene-based elastomer, a polyolefin elastomer, a flexible polyvinyl chloride (PVC), an isoprene, a thermoplastic isoprene composite, a natural rubber, any alloy, any blend, or combination thereof.

According to yet other embodiments, the non-fluoroether based elastomer of the outer layer may include a diene elastomer. According to particular embodiments, the diene elastomer may be a copolymer formed from at least one diene monomer. For example, the diene elastomer may be a copolymer of ethylene, propylene and diene monomer (EPDM), a thermoplastic EPDM composite, or combination thereof. According to a particular embodiment, an exemplary diene monomer may include a conjugated diene, such as butadiene, isoprene, chloroprene, or the like; a non-conjugated diene including from 5 to about 25 carbon atoms, such as 1,4-pentadiene, 1,4-hexadiene, 1,5-hexadiene, 2,5-dimethyl-1,5-hexadiene, 1,4-octadiene, or the like; a cyclic diene, such as cyclopentadiene, cyclohexadiene, cyclooctadiene, dicyclopentadiene, or the like; a vinyl cyclic ene, such as 1-vinyl-1-cyclopentene, 1-vinyl-1-cyclohexene, or the like; an alkylbicyclononadiene, such as 3-methylbicyclo-(4,2,1)-nona-3,7-diene, or the like; an indene, such as methyl tetrahydroindene, or the like; an alkenyl norbornene, such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, or the like; a tricyclodiene, such as 3-methyltricyclo $(5,2,1,0^2,6)$-deca-3,8-diene or the like; or any combination thereof.

According to yet other embodiments, the non-fluoroether based elastomer of the outer layer may include a styrene-based elastomer. The styrene-based elastomer typically includes a styrenic based block copolymer that includes, for example, a multiblock copolymer such as a diblock, triblock, polyblock, or any combination thereof. In a particular embodiment, the styrenic based block copolymer is a block copolymer having AB units. Typically, the A units are alkenyl arenes such as a styrene, an alpha-methylstyrene, para-methylstyrene, para-butyl styrene, or combination thereof. In a particular embodiment, the A units are styrene. In an embodiment, the B units include alkenes such as butadiene, isoprene, ethylene, butylene, propylene, or combination thereof. In a particular embodiment, the B units are ethylene, isoprene, or combinations thereof. Exemplary styrenic based block copolymers include triblock styrenic block copolymers (SBC) such as styrene-butadiene-styrene (SBS), styrene-isoprene-styrene (SIS), styrene-ethylene butylene-styrene (SEBS), styrene-ethylene propylene-styrene (SEPS), styrene-ethylene-ethylene-butadiene-styrene (SEEBS), styrene-ethylene-ethylene-propylene-styrene (SEEPS), styrene-isoprene-butadiene-styrene (SIBS), or combinations thereof. In an embodiment, the styrenic based block copolymer is saturated, i.e. does not contain any free olefinic double bonds. In an embodiment, the styrenic based block copolymer contains at least one free olefinic double bond, i.e. an unsaturated double bond. In a particular embodiment, the styrene-based elastomer is a styrene-ethylene based copolymer, a styrene isoprene based copolymer, a blend, or combination thereof.

According to yet other embodiments, the polyolefin elastomer of the outer layer may include a homopolymer, a copolymer, a terpolymer, an alloy, or any combination thereof formed from a monomer, such as ethylene, propylene, butene, pentene, methyl pentene, octene, or any combination thereof. An exemplary polyolefin elastomer includes high density polyethylene (HDPE), medium density polyethylene (MDPE), low density polyethylene (LDPE), ultra or very low density polyethylene (VLDPE), ethylene propylene copolymer, ethylene butene copolymer, polypropylene (PP), polybutene, polybutylene, polypentene, polymethylpentene, polystyrene, ethylene propylene rubber (EPR), ethylene octene copolymer, blend thereof, mixture thereof, and the like. The polyolefin elastomer further includes any olefin-based random copolymer, olefin-based impact copolymer, olefin-based block copolymer, olefin-based specialty elastomer, olefin-based specialty plastomer, metallocene-based olefin, blend thereof, mixture thereof, and the like.

According to other embodiments, the non-fluoroether based elastomer of the outer layer may be self-bonding. For a self-bonding polymer, a modification to the non-fluoroether based elastomer, either through grafting chemically active functionalities onto the polymeric chains within the non-fluoroether based elastomer or through incorporation of a separated chemical component into the matrix of the non-fluoroether based elastomer, leads to enhanced bonding between the non-fluoroether based elastomer and the layer it is directly adjacent to. Any chemically active functionalities or chemical components are envisioned.

According to still other embodiments, the non-fluoroether based elastomer of the outer layer may further include any reasonable additive such as a curing agent, a photoinitiator, a filler, a plasticizer, or any combination thereof. Any curing agent is envisioned that increases and/or enhances crosslinking of the non-fluoroether based elastomer of the outer layer. In a further embodiment, the use of a curing agent may provide desirable properties such as decreased permeation of small molecules and improved elastic recovery of the outer layer compared to an outer layer that does not include a curing agent. Any curing agent is envisioned such as, for example, a sulfur compound, an organic peroxide, or combination thereof. In an embodiment, the curing agent is an organic peroxide. Any reasonable amount of curing agent is envisioned. Alternatively, the non-fluoroether based elastomer of the outer layer may be substantially free of a curing agents, a photoinitiator, a filler, a plasticizer, or a combination thereof. "Substantially free" as used herein refers to less than about 1.0% by weight, or even less than about 0.1% by weight of the total weight of the non-fluoroether based elastomer of the outer layer.

In an embodiment, the non-fluoroether based elastomer of the outer layer may have a particular shore hardness. In a particular embodiment, the non-fluoroether based elastomer of the outer layer may have a shore hardness that is less than the shore hardness of the fluoroether elastomer of the inner layer. In another embodiment, the non-fluoroether based elastomer of the outer layer may have a shore hardness that is greater than the shore hardness of the fluoroether elastomer of the inner layer. In yet another embodiment, the non-fluoroether based elastomer of the outer layer may have a shore hardness that is the same as the shore hardness of the fluoroether elastomer of the inner layer.

According to certain embodiments, the outer layer may have a shore D of less than about 95, such as a shore A of about 20 to shore D of about 95, such as shore A of about 20 to shore D of about 65, such as shore A of about 20 to about 80 as measured by ASTM D2240. In an embodiment, the hardness of the outer layer is a shore A of less than about 80, such as about 20 to about 80, such as about 40 to about 80, or even about 40 to about 60. It will be appreciated that the hardness can be within a range between any of the minimum and maximum values noted above.

According to yet other embodiments, the non-fluoroether based elastomer of the outer layer may have further desirable properties. In an embodiment, the non-fluoroether based elastomer of the outer layer may have a much higher flexibility than the inner layer as defined by a combination of durometer (or hardness), tensile strength, elongation, and flexibility tests. In an embodiment, the outer layer may have a recoverable deformation greater than 150% and the inner layer has a recoverable deformation less than 150% as per ASTM D1646.

According to yet other embodiments, the multilayer tube may further include a contact zone between the inner layer and the outer layer of the multilayer tube. According to still other embodiments, contact zone may include a peroxide residue. According to still other embodiments, the contact zone may include a catalyst residue. According to yet other embodiments, the catalyst residue may include a peroxide based residue, a phenolic based residue, a hydrosilation residue, a platinum based residue, or any combination thereof. According to yet other embodiments, the catalyst residue may include a hydrosilylation catalyst. According to yet other embodiments, the catalyst residue may include titanium, iron, manganese, cobalt, copper, zinc, molybdenum, ruthenium, rhodium, palladium, tin, ytterbium, rhenium, iridium, platinum, or any combination thereof.

According to still other embodiments, the multilayer tube may include a particular adhesion force between the inner layer and the outer layer as measured using T-peel, ASTM D1876. For example, the multilayer tube may have an adhesion force between the inner layer and the outer layer of at least about 1 ppi, such as, at least about 2 ppi or at least about 3 ppi or at least about 4 ppi or at least about 5 ppi or at least about 6 ppi or at least about 7 ppi or at least about 8 ppi or at least about 9 ppi or even at least about 10 ppi. According to still other embodiments, the multilayer tube may have an adhesion force between the inner layer and the outer layer of not greater than the failure mode of the inner layer and the outer layer, wherein the failure made is defined as the adhesion force at which the inner layer, the outer layer, or both the inner layer and the outer layer structurally fail before the adhesion between the inner layer and the outer layer fails. It will be appreciated that the adhesion force between the inner layer and the outer layer may be within a range between any of the minimum and maximum values noted above. It will be further appreciated that adhesion force between the inner layer and the outer layer may be any value between any of the minimum and maximum values noted above.

In an example, FIG. 1 includes an illustration of an exemplary multilayer tube 100 that has two layers. For example, an inner layer 102 may be bonded to an outer layer 104. In certain embodiments, the inner and outer layers (102, 104) may be in direct contact, absent any intervening layers, such as adhesive layers. According to certain embodiments, the inner layer 102 may have an inner lumen 106 that defines a passage for fluid to flow through. According to still other embodiments, the inner layer 102 may include a fluoroether elastomer and the outer layer 104 may be a non-fluoroether based elastomer as described herein.

Returning to FIG. 1, according to certain embodiments, the inner layer 102 is thinner than the outer layer 104.

According to still other embodiments, the multilayer tube 100 may have a particular total thickness (MTT). For example, the total thickness of the layers of the multilayer tube 100 may be at least 3 mils, such as, at least about 5 mils or at least about 10 mils or at least about 20 mils or at least about 30 mils or at least about 40 mils or at least about 50 mils or at least about 60 mils or at least about 70 mils or at least about 80 mils or at least about 90 mils or at least about 100 mils or at least about 110 mils or at least about 120 mils or at least about 130 mils or at least about 140 mils or at least about 150 mils or at least about 160 mils or at least about 170 mils or at least about 180 mils or at least about 190 mils or even at least about to about 200 mils. According to yet other embodiments, the total thickness of the layers of the multilayer tube 100 may be not greater than about 1000 mils, such as, not greater than about 900 mils or not greater than about 800 mils or not greater than about 700 mils or not greater than about 600 mils or not greater than about 500 mils. It will be appreciated that the total thickness of the layers of the multilayer tube 100 may be within a range between any of the minimum and maximum values noted above. It will be further appreciated that the total thickness of the layers of the multilayer tube 100 may be any value between any of the minimum and maximum values noted above.

According to yet other embodiments, the inner layer 102 may have a particular thickness (ILT). For example, the thickness of the inner layer 102 may be at least about 0.1 mil or at least about 0.2 mils or at least about 0.3 mils or at least about 0.4 mils or at least about 0.5 mils or at least about 0.6 mils or at least about 0.7 mils or at least about 0.8 mils or at least about 0.9 mils or at least about 1.0 mils or at least about 1.1 mils or at least about 1.2 mils or at least about 1.3 mils or at least about 1.4 mils or at least about 1.5 mils or at least about 1.6 mils or at least about 1.7 mils or at least about 1.8 mils or even at least about 1.9 mils. According to still other embodiments, the thickness of the inner layer 102 may be not greater than about 150 mils, such as, not greater than about 140 mils or not greater than about 130 mils or not greater than about 120 mils or not greater than about 110 mils or not greater than about 100 mils or not greater than about 90 mils or not greater than about 80 mils or not greater than about 70 mils or not greater than about 60 mils or not greater than about 50 mils or not greater than about 40 mils or not greater than about 30 mils or not greater than about 20 mils or not greater than about 10 mils or not greater than about 5 mils or even not greater than about 2 mils. It will be appreciated that the thickness of the inner layer 102 may be within a range between any of the minimum and maximum values noted above. It will be further appreciated that the thickness of the inner layer 102 may be any value between any of the minimum and maximum values noted above.

According to still other embodiments, the outer layer 104 may have a particular thickness (OLT). For example, the thickness of the outer layer 104 may be at least about 0.1 mil or at least about 0.2 mils or at least about 0.3 mils or at least about 0.4 mils or at least about 0.5 mils or at least about 0.6 mils or at least about 0.7 mils or at least about 0.8 mils or at least about 0.9 mils or at least about 1.0 mils or at least about 1.1 mils or at least about 1.2 mils or at least about 1.3 mils or at least about 1.4 mils or at least about 1.5 mils or at least about 1.6 mils or at least about 1.7 mils or at least about 1.8 mils or even at least about 1.9 mils. According to still other embodiments, the thickness of the outer layer 104 may be not greater than about 150 mils, such as, not greater than about 140 mils or not greater than about 130 mils or not greater than about 120 mils or not greater than about 110 mils or not greater than about 100 mils or not greater than about 90 mils or not greater than about 80 mils or not greater than about 70 mils or not greater than about 60 mils or not greater than about 50 mils or not greater than about 40 mils or not greater than about 30 mils or not greater than about 20 mils or not greater than about 10 mils or not greater than about 5 mils or even not greater than about 2 mils. It will be appreciated that the thickness of the outer layer 104 may be within a range between any of the minimum and maximum values noted above. It will be further appreciated that the thickness of the outer layer 104 may be any value between any of the minimum and maximum values noted above.

According to yet other embodiments, the multilayer tube 100 may have a particular thickness ratio ILT/MTT, where ILT is the thickness of the inner layer 102 of the multilayer tube 100 and MTT is the thickness of the multilayer tube 100. For example, the thickness ratio ILT/MTT of the multilayer tube 100 may be at least about 0.01, such as, at least about 0.02 or at least about 0.03 or at least about 0.04 or at least about 0.05 or at least about 0.10 or at least about 0.15 or at least about 0.20 or at least about 0.25 or at least about 0.30 or at least about 0.35 or at least about 0.40 or even at least about 0.45. According to still other embodiments, the thickness ratio ILT/MTT of the multilayer tube 100 may be not greater than about 0.99, such as, not greater than about 0.95 or not greater than about 0.90 or not greater than about 0.85 or not greater than about 0.80 or not greater than about 0.75 or not greater than about 0.70 or not greater than about 0.65 or not greater than about 0.60 or not greater than about 0.55 or even not greater than about 0.50. It will be appreciated that the thickness ratio ILT/MTT of the multilayer tube 100 may be within a range between any of the minimum and maximum values noted above. It will be further appreciated that the thickness ratio ILT/MTT of the multilayer tube 100 may be any value between any of the minimum and maximum values noted above.

According to yet other embodiments, the multilayer tube 100 may have a particular thickness ratio OLT/MTT, where OLT is the thickness of the outer layer 104 of the multilayer tube 100 and MTT is the thickness of the multilayer tube 100. For example, the thickness ratio OLT/MTT of the multilayer tube 100 may be at least about 0.01, such as, at least about 0.02 or at least about 0.03 or at least about 0.04 or at least about 0.05 or at least about 0.10 or at least about 0.15 or at least about 0.20 or at least about 0.25 or at least about 0.30 or at least about 0.35 or at least about 0.40 or even at least about 0.45. According to still other embodiments, the thickness ratio OLT/MTT of the multilayer tube 100 may be not greater than about 0.99, such as, not greater than about 0.95 or not greater than about 0.90 or not greater than about 0.85 or not greater than about 0.80 or not greater than about 0.75 or not greater than about 0.70 or not greater than about 0.65 or not greater than about 0.60 or not greater than about 0.55 or even not greater than about 0.50. It will be appreciated that the thickness ratio OLT/MTT of the multilayer tube 100 may be within a range between any of the minimum and maximum values noted above. It will be further appreciated that the thickness ratio OLT/MTT of the multilayer tube 100 may be any value between any of the minimum and maximum values noted above.

According to yet other embodiments, the multilayer tube 100 may have a particular thickness ratio OLT/ILT, where OLT is the thickness of the outer layer 104 of the multilayer tube 100 and ILT is the thickness of the inner layer 102 of the multilayer tube 100. For example, the thickness ratio OLT/ILT of the multilayer tube 100 may be at least about 0.01, such as, at least about 0.1 or at least about 1.0 or at least about 5 or at least about 10 or at least about 15 or at least about 20 or at least about 25 or at least about 30 or even at least about 35. According to still other embodiments, the thickness ratio OLT/ILT of the multilayer tube 100 may be not greater than about 99, such as, not greater than about 95 or not greater than about 90 or even not greater than about 85. It will be appreciated that the thickness ratio OLT/ILT of the multilayer tube 100 may be within a range between any of the minimum and maximum values noted above. It will be further appreciated that the thickness ratio OLT/ILT of the multilayer tube 100 may be any value between any of the minimum and maximum values noted above.

According to certain embodiments, at least one layer may be treated to improve adhesion between the inner layer 102 and the outer layer 104. Any treatment is envisioned that increases the adhesion between two adjacent layers. For instance, a surface of the inner layer 102 that is directly adjacent to the outer layer 104 is treated. Further, a surface of the outer layer 104 that is directly adjacent to the inner layer 102 is treated. In an embodiment, the treatment may include surface treatment, chemical treatment, sodium etching, use of a primer, or any combination thereof. In an embodiment, the treatment may include corona treatment, UV treatment, electron beam treatment, flame treatment, scuffing, sodium naphthalene surface treatment, or any combination thereof.

According to still other embodiments, any post-cure steps may be envisioned. In particular, the post-cure step includes any thermal treatment, radiation treatment, or combination thereof. Any thermal conditions are envisioned. In an embodiment, the post-cure step includes any radiation treatment such as, for example, e-beam treatment, gamma treatment, or combination thereof. In an example, the gamma radiation or ebeam radiation is at about 0.1 MRad to about 50 MRad. In a particular embodiment, the post-cure step may be provided to eliminate any residual volatiles, increase interlayer and/or intralayer crosslinking, or combination thereof.

While only two layers are illustrated in FIG. 1, the multilayer tube 100 may further include additional layers (not illustrated). Any additional layer may be envisioned such as a tie layer, an elastomeric layer, a reinforcement layer, or any combination thereof. Any position of the additional layer with respect to the inner layer and outer layer is envisioned. For instance, any additional layer may be disposed on surface 108 of the outer layer 104. In an example, an additional layer such as a reinforcement layer (not shown) may be incorporated within or between additional layers disposed in proximity to surface 108 of the outer layer 104. An exemplary reinforcement layer may include a wire, a fiber, a fabric, such as a woven fabric, a braid, or any combination thereof, formed of a material such as polyester, an adhesion modified polyester, a polyamide, a polyaramid, a glass, a metal, or a combination thereof. In an embodiment, the multilayer tube consists of the inner layer and the outer layer as described.

In a particular embodiment, the multilayer tube, such as a fluid conduit is formed by providing the inner layer including the fluoroether elastomer and applying the outer layer to directly contact the bond surface of the inner layer, such as without intervening adhesive or bond enhancing layers. The fluoroether elastomer may be provided by any method envisioned and is dependent upon the fluoroether elastomer chosen for the inner layer. In an embodiment, the fluoroether elastomer is melt processable. "Melt processable" as used herein refers to a fluoroether elastomer that can melt and flow to extrude in any reasonable form such as films, tubes, fibers, molded articles, or sheets. For instance, the melt processable fluoroether elastomer is a flexible material. In an embodiment, the fluoroether elastomer is extruded, injection molded, or mandrel wrapped. In an exemplary embodiment, the fluoroether elastomer is extruded. In an example, the bond surface of the inner layer is prepared with a surface treatment. In an embodiment, the fluoroether elastomer may be cured before, after, or during application of any further layers on the multilayer tube. The inner layer may be cured in place using a variety of curing techniques such as via heat, radiation, or any combination thereof. Curing provides a fluoroether elastomer inner layer.

The outer layer includes a non-fluoroether based elastomer as described above. The a non-fluoroether based elastomer may be provided by any method envisioned and is dependent upon the non-fluoroether based elastomer chosen for the outer layer. The method may further include providing the outer layer by any method. Providing the outer layer depends on the non-fluoroether based elastomer material chosen for the outer layer. In an embodiment, the outer layer is a "melt processable" non-fluoroether based elastomer. "Melt processable non-fluoroether based elastomer" as used herein refers to a polymer that can melt and flow to extrude in any reasonable form such as films, tubes, fibers, molded articles, or sheets. In an embodiment, the outer layer is extruded or injection molded. In an exemplary embodiment, the outer layer may be extruded. In a particular embodiment, the outer layer is extruded over the inner layer and the outer layer is cured. The outer layer may be cured in place using a variety of curing techniques such as via heat, radiation, or any combination thereof.

In a particular embodiment, the inner layer is the fluoroether elastomer layer and the outer layer is the non-fluoroether based elastomer. In an exemplary embodiment, the inner layer is provided by heating the fluoroether elastomer to an extrusion viscosity and extruding the fluoroether elastomer to form the inner layer. The outer layer is provided by heating the non-fluoroether based elastomer to an extrusion viscosity and then extruding the non-fluoroether based elastomer. In a particular embodiment, the difference of the viscosity of the inner layer and the viscosity of the outer layer is not greater than 25%, such as not greater than 20%, not greater than 10%, or even 0% to provide for improved processing. Although not being bound by theory, it is surmised that the viscosity similarity improves the adhesion of the inner layer to the outer layer. In an embodiment, the inner layer and the outer layer are co-extruded. Advantageously, the inner layer and the outer layer may also be cured at the same time, which may enhance the adhesive strength between the two layers. In particular, the inner layer and the outer layer have cohesive strength between the two layers, i.e. cohesive failure occurs wherein the structural integrity of the inner layer and/or the outer layer fails before the bond between the two materials fails.

Although generally described as a multilayer tube, any reasonable polymeric article can be envisioned. The polymeric article may alternatively take the form of a film, a washer, or a fluid conduit. For example, the polymeric article may take the form or a film, such as a laminate, or a planar article, such as a septa or a washer. In another example, the polymeric article may take the form of a fluid conduit, such as tubing, a pipe, a hose or more specifically flexible tubing, transfer tubing, pump tubing, chemical resistant tubing, warewash tubing, laundry tubing, high purity tubing, smooth bore tubing, fluoroelastomer lined pipe, or rigid pipe, or any combination thereof. In a particular embodiment, the multilayer tube can be used as tubing or hosing where chemical resistance and pumpability is desired. For instance, a multilayer tubing is a fuel tube, a pump tube, such as for chemical or laundry detergent dispensing, a peristaltic pump tube, or a liquid transfer tube, such as a chemically resistant liquid transfer tube.

Tubing includes an inner surface that defines a central lumen of the tube. For instance, tubing may be provided that has any useful diameter size for the particular application chosen. In an embodiment, the tubing may have an outside diameter (OD) of up to about 5.0 inches, such as about 0.25 inch, 0.50 inch, and 1.0 inch. In an embodiment, the tubing may have an inside diameter (ID) of about 0.03 inches to about 4.00 inches, such as about 0.06 inches to about 1.00 inches. It will be appreciated that the inside diameter can be within a range between any of the minimum and maximum values noted above. Multilayer tubing as described advantageously exhibits desired properties such as increased lifetime. For example, the multilayer tube may have a pump life of at least about 6 months in a peristaltic pump with the pump running under intermittent conditions such with one minute on, 5 minutes off for 10 hours a day. In an embodiment, the multilayer tube has a flow rate that changes by less than about 30%, such as less than about 20%, such as less than about 10%, or even less than about 5%.

In embodiment, the resulting multilayer tube may have further desirable physical and mechanical properties. In an embodiment, the fluoroether elastomer may be particularly suited with a desirable resistance to a variety of chemical solutions. For instance, the fluoroether elastomer has a percent volume change in a chemical solution with a pH of about 1 to about 14 for 168 hours at 158° F. of no greater than 20%, or even no greater than 15%. Chemical solutions with a pH of about 1 to about 14 include, for example, basic chemicals, detergents, acidic chemicals, sours, oxidizers, the like, or any combination thereof. Exemplary basic chemicals include, but are not limited to, potassium hydroxide, sodium hydroxide at 40% or less, and the like. For laundry and warewashing, these basic chemicals are typically a detergent. As for acidic chemicals, strong inorganic acids include, but are not limited to, hydrochloric acid, sulfuric acid, nitric acid, phosphoric acid, as well as weaker acids such as fluorosilicic acid and oxalic acid at 10% or less, and the like. For laundry and warewashing, these acidic chemicals are typically known as sours. Exemplary strong oxidizers include, but are not limited to, sodium hypochlorite (bleach) and organic peracids, such as peracetic acid, or combination thereof. Typically, the commercial laundry market considers these as de-stainers or bleaches. In an embodiment, the fluoroether elastomer has a percent volume change in an oxidizer for 168 hours at 73° F. of no greater than 30%, such as no greater than 20%, or even no greater than 10%. In a particular embodiment, the fluoroether elastomer has a percent volume change in an oxidizer, such as methanol, for 168 hours at 73° F. of no greater than 30%, such as no greater than 20%, or even no greater than 10%.

In an embodiment, the fluoroether elastomer of the multilayer tube has a percent volume change in a small molecule formulation for 168 hours at 73° F. of no greater than 100%, such as no greater than 50%, or even not greater than 25%. A "small molecule formulation" includes a certain class of laundry detergents that use citrus aromas as part of their formulation. These formulations may contain, for example, alcohols, ketones, aldehydes, and other small molecules, such as citrus terpenes at less than 15%. Other small molecules include, by are not limited to isopropanol, 2-butoxy ethanol, D-limonene, citrus terpenes, dipropylene glycol monobutyl ether; glycol ether DPnB; 1-(2-butoxy-1-methylethoxy)propan-2-ol, diethylene glycol butyl ether; 2-(2-butoxyethoxy)-ethanol, fatty acids, tall-oil, sulfonic acids, C14-16-alkane hydroxyl, C14-16-alkene, sodium salt, C12-16 ethoxylated alcohols, the like, or any combination thereof.

In an embodiment, the multilayer tubes are kink-resistant and appear transparent or at least translucent. In particular, the multilayer tube has desirable flexibility and substantial clarity or translucency. For example, the multilayer tube has a bend radius of at least 0.5 inches. For instance, the multilayer tube may advantageously produce low durometer tubes. For example, the multilayer tube has a Shore A durometer of between about 20 and about 90, such as between about 40 to about 90 having desirable mechanical properties may be formed. In an embodiment, the materials that make up the multilayer tube have a composite flexural modulus of at least about 50 MPa, such as about 50 MPa to about 200 MPa, as measured by ASTM D790. Such properties are indicative of a flexible material. It will be appreciated that the hardness and flexural modulus can be within a range between any of the minimum and maximum values noted above.

Applications for the multilayer tubing are numerous. In an exemplary embodiment, the multilayer tubing may be used in applications such a household wares, industrial, wastewater, digital print equipment, automotive, or other applications where chemical resistance, and/or low permeation to gases and hydrocarbons are desired. According to still other embodiments, the multilayer tubing may, for example, be used in application such as hazard fluid transfer application, anti-corrosive applications, low permeation applications, low absorption tubing for chemical dispensing and life science application, seal or gasket applications in aerospace fields, or seal or gasket applications for chemical resistance fields.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A multilayer tube comprising: an inner layer comprising a fluoroether elastomer; an outer layer comprising a non-fluoroether based elastomer; and an adhesion force between the inner layer and the outer layer of at least about 1 ppi.

Embodiment 2. The multilayered tube of embodiment 1, wherein the multilayer tube further comprises a contact zone between the inner layer and the outer layer, and wherein the contact zone comprises a peroxide residue.

Embodiment 3. The multilayered tube of embodiment 1, wherein the multilayer tube further comprises a contact zone between the inner layer and the outer layer, and wherein the contact zone comprises a catalyst residue.

Embodiment 4. The multilayered tube of embodiment 3, wherein the catalyst residue comprises a peroxide based residue, a phenolic based residue, a hydrosilation residue, a platinum based residue, or any combination thereof.

Embodiment 5. The multilayered tube of embodiment 3, wherein the catalyst residue comprises a hydrosilylation catalyst.

Embodiment 6. The multilayered tube of embodiment 3, wherein the catalyst residue comprises titanium, iron, manganese, cobalt, copper, zinc, molybdenum, ruthenium, rhodium, palladium, tin, ytterbium, rhenium, iridium, platinum, or any combination thereof.

Embodiment 7. The multilayered tube of embodiment 1, wherein the outer layer is a fluoroether elastomer layer.

Embodiment 8. The multilayered tube of embodiment 1, wherein the fluoroether elastomer of the inner layer comprises fluorosilicone rubber, fluoroelastomers, perfluoroelastomers, or any combination thereof.

Embodiment 9. The multilayered tube of embodiment 1, wherein the fluoroether elastomer of the inner layer consists of fluorosilicone rubber, fluoroelastomers, perfluoroelastomers, or any combination thereof.

Embodiment 10. The multilayered tube of embodiment 1, wherein the outer layer is a non-fluoroether based elastomer layer.

Embodiment 11. The multilayered tube of embodiment 1, wherein the non-fluoroether based elastomer of the outer layer comprises silicone, a polyolefin elastomer, a polyurethane elastomer, a diene elastomer, a butyl rubber, a natural rubber, a polyurethane rubber, an ethylene propylene diene monomer rubber, an isoprene rubber, a nitrile rubber, a styrene butadiene rubber, a blend, or any combination thereof.

Embodiment 12. The multilayered tube of embodiment 1, wherein the non-fluoroether based elastomer of the outer layer consists of silicone, a polyolefin elastomer, a polyurethane elastomer, a diene elastomer, a butyl rubber, a natural rubber, a polyurethane rubber, an ethylene propylene diene monomer rubber, an isoprene rubber, a nitrile rubber, a styrene butadiene rubber, a blend, or any combination thereof.

Embodiment 13. The multilayered tube of embodiment 1, wherein the adhesion force between the inner layer and the outer layer is at least about 1 ppi, at least about 2 ppi, at least about 3 ppi, at least about 4 ppi, at least about 5 ppi, at least about 6 ppi, at least about 7 ppi, at least about 8 ppi, at least about 9 ppi, at least about 10 ppi.

Embodiment 14. The multilayered tube of embodiment 13, wherein the adhesion force between the inner layer and the outer layer is not greater than the failure mode of the inner layer and the outer layer, wherein the failure made is defined as the adhesion force at which the inner layer, the outer layer, or both the inner layer and the outer layer structurally fail before the adhesion between the inner layer and the outer layer fails.

Embodiment 15. The multilayered tube of embodiment 1, wherein the multilayer tube comprises a thickness ratio ILT/MTT of not greater than about 0.01, where ILT is the thickness of the inner layer of the multilayer tube and MTT is the thickness of the multilayer tube.

Embodiment 16. The multilayered tube of embodiment 15, wherein the multilayer tube comprises a thickness ratio ILT/MTT of at least about 0.49, where ILT is the thickness of the inner layer of the multilayer tube and MTT is the thickness of the multilayer tube.

Embodiment 17. The multilayered tube of embodiment 1, wherein the multilayer tube comprises a thickness ratio OLT/MTT of not greater than about 0.1, where OLT is the thickness of the outer layer of the multilayer tube and MTT is the thickness of the multilayer tube.

Embodiment 18. The multilayered tube of embodiment 17, wherein the multilayer tube comprises a thickness ratio OLT/MTT of at least about 0.99, where OLT is the thickness of the outer layer of the multilayer tube and MTT is the thickness of the multilayer tube.

Embodiment 19. The multilayered tube of embodiment 1, wherein the multilayer tube comprises a thickness ratio OLT/ILT of not greater than about 100, where ILT is the thickness of the inner layer of the multilayer tube and OLT is the thickness of the outer layer of the multilayer tube.

Embodiment 20. The multilayered tube of embodiment 19, wherein the multilayer tube comprises a thickness ratio OLT/ILT of at least about 1.0, where ILT is the thickness of the inner layer of the multilayer tube and OLT is the thickness of the outer layer of the multilayer tube.

Embodiment 21. The multilayered tube of embodiment 1, wherein the multilayer tube has a thickness MTT of at least about 3 mils.

Embodiment 22. The multilayered tube of embodiment 21, wherein the multilayer tube has a thickness MTT of not greater than about 1000 mils.

Embodiment 23. The multilayered tube of embodiment 1, wherein the inner layer has a thickness ILT of at least about 0.1 mil.

Embodiment 24. The multilayered tube of embodiment 23, wherein the inner layer has a thickness ILT of not greater than about 100 mils.

Embodiment 25. The multilayered tube of embodiment 1, wherein the outer layer has a thickness OLT of at least about 0.1 mil.

Embodiment 26. The multilayered tube of embodiment 25, wherein the outer layer has a thickness OLT of not greater than about 100 mils.

Embodiment 27. A method of forming a multilayer tube, wherein the method comprises: providing an inner layer, wherein the inner layer comprises a fluoroether elastomer; providing an outer layer overlying the inner layer, wherein the outer layer comprises a non-fluoroether based elastomer; and curing the inner layer and the outer layer to form a multilayer tube, wherein the multilayer tube comprises an adhesion force between the inner layer and the outer layer of at least about 1 ppi.

Embodiment 28. The method of embodiment 27, wherein providing the inner layer comprises an extrusion process.

Embodiment 29. The method of embodiment 27, wherein providing the outer layer comprises an extrusion process.

Embodiment 30. The method of embodiment 27, wherein providing the inner layer and providing the outer layer comprise a coextrusion process.

Embodiment 31. The method of embodiment 27, wherein providing the inner layer comprises a molding process.

Embodiment 32. The method of embodiment 27, wherein providing the outer layer comprises a molding process.

Embodiment 33. The method of embodiment 27, wherein providing the inner layer and providing the outer layer comprise a comolding process.

Embodiment 34. The method of embodiment 27, wherein the multilayer tube further comprises a contact zone between the inner layer and the outer layer, and wherein the contact zone comprises a peroxide residue.

Embodiment 35. The method of embodiment 27, wherein the multilayer tube further comprises a contact zone between the inner layer and the outer layer, and wherein the contact zone comprises a catalyst residue.

Embodiment 36. The method of embodiment 35, wherein the catalyst residue comprises a peroxide based residue, a phenolic based residue, a hydrosilation residue, a platinum based residue, or any combination thereof.

Embodiment 37. The method of embodiment 35, wherein the catalyst residue comprises a hydrosilylation catalyst.

Embodiment 38. The method of embodiment 35, wherein the catalyst residue comprises titanium, iron, manganese, cobalt, copper, zinc, molybdenum, ruthenium, rhodium, palladium, tin, ytterbium, rhenium, iridium, platinum, or any combination thereof.

Embodiment 39. The method of embodiment 27, wherein the outer layer is a fluoroether elastomer layer.

Embodiment 40. The method of embodiment 27, wherein the fluoroether elastomer of the inner layer comprises fluorosilicone rubber, fluoroelastomers, perfluoroelastomers, or any combination thereof.

Embodiment 41. The method of embodiment 27, wherein the fluoroether elastomer of the inner layer consists of fluorosilicone rubber, fluoroelastomers, perfluoroelastomers, or any combination thereof.

Embodiment 42. The method of embodiment 27, wherein the outer layer is a non-fluoroether based elastomer layer.

Embodiment 43. The method of embodiment 27, wherein the non-fluoroether based elastomer of the outer layer comprises silicone, a polyolefin elastomer, a polyurethane elastomer, a diene elastomer, a butyl rubber, a natural rubber, a polyurethane rubber, an ethylene propylene diene monomer rubber, an isoprene rubber, a nitrile rubber, a styrene butadiene rubber, a blend, or any combination thereof.

Embodiment 44. The method of embodiment 27, wherein the non-fluoroether based elastomer of the outer layer consists of silicone, a polyolefin elastomer, a polyurethane elastomer, a diene elastomer, a butyl rubber, a natural rubber, a polyurethane rubber, an ethylene propylene diene monomer rubber, an isoprene rubber, a nitrile rubber, a styrene butadiene rubber, a blend, or any combination thereof.

Embodiment 45. The method of embodiment 27, wherein the adhesion force between the inner layer and the outer layer is at least about 1 ppi, at least about 2 ppi, at least about 3 ppi, at least about 4 ppi, at least about 5 ppi, at least about 6 ppi, at least about 7 ppi, at least about 8 ppi, at least about 9 ppi, at least about 10 ppi.

Embodiment 46. The method of embodiment 45, wherein the adhesion force between the inner layer and the outer layer is not greater than the failure mode of the inner layer and the outer layer, wherein the failure made is defined as the point at which the inner layer, the outer layer of both structurally fail before adhesion between the inner layer and the outer layer fails.

Embodiment 47. The method of embodiment 27, wherein the multilayer tube comprises a thickness ratio ILT/MTT of not greater than about 0.99, where ILT is the thickness of the inner layer of the multilayer tube and MTT is the thickness of the multilayer tube.

Embodiment 48. The method of embodiment 47, wherein the multilayer tube comprises a thickness ratio ILT/MTT of at least about 0.01, where ILT is the thickness of the inner layer of the multilayer tube and MTT is the thickness of the multilayer tube.

Embodiment 49. The method of embodiment 27, wherein the multilayer tube comprises a thickness ratio OLT/MTT of not greater than about 0.99, where OLT is the thickness of the outer layer of the multilayer tube and MTT is the thickness of the multilayer tube.

Embodiment 50. The method of embodiment 49, wherein the multilayer tube comprises a thickness ratio OLT/MTT of at least about 0.01, where OLT is the thickness of the outer layer of the multilayer tube and MTT is the thickness of the multilayer tube.

Embodiment 51. The method of embodiment 27, wherein the multilayer tube comprises a thickness ratio OLT/ILT of not greater than about 99, where ILT is the thickness of the inner layer of the multilayer tube and OLT is the thickness of the outer layer of the multilayer tube.

Embodiment 52. The method of embodiment 51, wherein the multilayer tube comprises a thickness ratio OLT/ILT of at least about 0.01, where ILT is the thickness of the inner layer of the multilayer tube and OLT is the thickness of the outer layer of the multilayer tube.

Embodiment 53. The method of embodiment 27, wherein the multilayer tube has a thickness MTT of at least about 3 mils.

Embodiment 54. The method of embodiment 53, wherein the multilayer tube has a thickness MTT of not greater than about 1000 mils.

Embodiment 55. The method of embodiment 27, wherein the inner layer has a thickness ILT of at least about 0.1 mil.

Embodiment 56. The method of embodiment 55, wherein the inner layer has a thickness ILT of not greater than about 150 mils.

Embodiment 57. The method of embodiment 27, wherein the outer layer has a thickness OLT of at least about 0.1 mil.

Embodiment 58. The method of embodiment 57, wherein the outer layer has a thickness OLT of not greater than about 150 mils.

Embodiment 59. The multilayered tube of embodiment 1, wherein the fluoroether elastomer of the inner layer comprises a fluoroether elastomer with silicone cross-linking groups (e.g., "SIFEL", manufactured by Shin-etsu Chemical Co., Ltd.).

Embodiment 60. The multilayered tube of embodiment 1, wherein the fluoroether elastomer of the inner layer consists of a fluoroether elastomer with silicone cross-linking groups (e.g., "SIFEL", manufactured by Shin-etsu Chemical Co., Ltd.).

Embodiment 61. The multilayered tube of embodiment 1, wherein the multilayer tube is used in a hazard fluid transfer application, used in an anti-corrosive application, used in a low permeation application, used for low absorption tubing for chemical dispensing and life science, used in seal or gasket applications in aerospace fields, used in seal or gasket application for chemical resistance fields.

Embodiment 62. The method of embodiment 27, wherein the fluoroether elastomer of the inner layer comprises a fluoroether elastomer with silicone cross-linking groups (e.g., "SIFEL", manufactured by Shin-etsu Chemical Co., Ltd.).

Embodiment 63. The method of embodiment 27, wherein the fluoroether elastomer of the inner layer consists of a fluoroether elastomer with silicone cross-linking groups (e.g., "SIFEL", manufactured by Shin-etsu Chemical Co., Ltd.).

Embodiment 64. The method of embodiment 27, wherein the multilayer tube is used in a hazard fluid transfer application, used in an anti-corrosive application, used in a low permeation application, used for low absorption tubing for chemical dispensing and life science, used in seal or gasket applications in aerospace fields, used in seal or gasket application for chemical resistance fields.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A multilayer tube comprising:
an inner layer comprising a fluoroether elastomer;
an outer layer comprising a non-fluoroether based elastomer; and
an adhesion force between the inner layer and the outer layer of at least about 1 ppi, wherein the fluoroether elastomer of the inner layer comprises a fluoroether elastomer with silicon cross-linking groups, wherein the multilayer tube has a composite flexural modulus of at least about 50 MPa as measured by ASTM D790.

2. The multilayered tube of claim 1, wherein the multilayer tube further comprises a contact zone between the inner layer and the outer layer, and wherein the contact zone comprises a peroxide residue.

3. The multilayered tube of claim 1, wherein the multilayer tube further comprises a contact zone between the inner layer and the outer layer, and wherein the contact zone comprises a catalyst residue.

4. The multilayered tube of claim 3, wherein the catalyst residue comprises a peroxide based residue, a phenolic based residue, a hydrosilation residue, a platinum based residue, or any combination thereof.

5. The multilayered tube of claim 3, wherein the catalyst residue comprises a hydrosilylation catalyst.

6. The multilayered tube of claim 3, wherein the catalyst residue comprises titanium, iron, manganese, cobalt, copper, zinc, molybdenum, ruthenium, rhodium, palladium, tin, ytterbium, rhenium, iridium, platinum, or any combination thereof.

7. The multilayered tube of claim 1, wherein the fluoroether elastomer of the inner layer comprises a fluoroether elastomer with silicon cross-linking groups.

8. The multilayered tube of claim 1, wherein the fluoroether elastomer of the inner layer comprises fluorosilicone rubber, fluoroelastomers, perfluoroelastomers, or any combination thereof.

9. The multilayered tube of claim 1, wherein the fluoroether elastomer of the inner layer consists of fluorosilicone rubber, fluoroelastomers, perfluoroelastomers, or any combination thereof.

10. The multilayered tube of claim 1, wherein the outer layer is a non-fluoroether based elastomer layer.

11. The multilayered tube of claim 1, wherein the non-fluoroether based elastomer of the outer layer comprises silicone, a polyolefin elastomer, a polyurethane elastomer, a diene elastomer, a butyl rubber, a natural rubber, a polyurethane rubber, an ethylene propylene diene monomer rubber, an isoprene rubber, a nitrile rubber, a styrene butadiene rubber, a blend, or any combination thereof.

12. The multilayered tube of claim 1, wherein the non-fluoroether based elastomer of the outer layer consists of silicone, a polyolefin elastomer, a polyurethane elastomer, a diene elastomer, a butyl rubber, a natural rubber, a polyurethane rubber, an ethylene propylene diene monomer rubber, an isoprene rubber, a nitrile rubber, a styrene butadiene rubber, a blend, or any combination thereof.

13. The multilayered tube of claim 1, wherein the multilayer tube has a shore A durometer of between about 20 and about 90.

14. The multilayered tube of claim 13, wherein the adhesion force between the inner layer and the outer layer is not greater than the failure mode of the inner layer and the outer layer, wherein the failure mode is defined as the adhesion force at which the inner layer, the outer layer, or both the inner layer and the outer layer structurally fail before the adhesion between the inner layer and the outer layer fails.

15. The multilayered tube of claim 1, wherein the multilayer tube comprises a thickness ratio ILT/MTT of at least about 0.01 and not greater than about 0.99, where ILT is the thickness of the inner layer of the multilayer tube and MTT is the thickness of the multilayer tube.

16. The multilayered tube of claim 1, wherein the multilayer tube comprises a thickness ratio OLT/MTT of at least about 0.01 and not greater than about 0.99, where OLT is the thickness of the outer layer of the multilayer tube and MTT is the thickness of the multilayer tube.

17. The multilayered tube of claim 1, wherein the multilayer tube comprises a thickness ratio OLT/ILT of at least about 0.01 and not greater than about 99, where ILT is the thickness of the inner layer of the multilayer tube and OLT is the thickness of the outer layer of the multilayer tube.

18. The multilayered tube of claim 1, wherein the multilayer tube has a thickness MTT of at least about 3 mils and not greater than about 1000 mils.

* * * * *